', 
United States Patent

Schweitzer, Jr.

[15] 3,676,740

[45] July 11, 1972

[54] AUTOMATICALLY RESETTABLE FAULT INDICATOR

[72] Inventor: Edmund O. Schweitzer, Jr., Northbrook, Ill.

[73] Assignee: E. O. Schweitzer Manufacturing Co., Inc., Mundelein, Del.

[22] Filed: June 1, 1971

[21] Appl. No.: 148,687

[52] U.S. Cl. ............................317/22, 324/133, 340/253 A, 317/33 C, 317/33 SC
[51] Int. Cl. ..............................................G01r 13/00
[58] Field of Search ..........................324/132, 133, 127, 51; 340/253 A, 255, 373; 317/22, 33 SC, 33 C

[56] References Cited

UNITED STATES PATENTS 3,426,276 2/1969 Schweitzer.............................324/127
3,426,275 2/1969 Schweitzer.............................324/127

Primary Examiner—J. D. Miller
Assistant Examiner—Harvey Fendelman
Attorney—Robert R. Lockwood

[57] ABSTRACT

A pair of opposed L-shaped pole pieces of demagnetizable low coercive force material is arranged to embrace an alternating current carrying conductor with the short legs in opposition and the long legs carrying reset windings which are energized with unidirectional current from a capacitor that is charged by a rectifier energized from a capacitor plate electrostatically related to the conductor or a secondary winding of a transformer the primary winding of which is energized from the conductor. A four pole fault indicating rotor is held in a normal position by the magnetic fields from the short legs. A biasing permanent magnet, having magnetic poles of opposite polarity, is offset from the short legs and biases the rotor to fault indicating position when the L-shaped pole pieces are demagnetized by alternating magnetic flux generated by flow of fault current in the conductor. Permanent magnets at the distal ends of the long legs of the L-shaped pole pieces are effective to change the fault current response of the rotor.

10 Claims, 7 Drawing Figures

PATENTED JUL 11 1972　　　　　　　　　　　　3,676,740
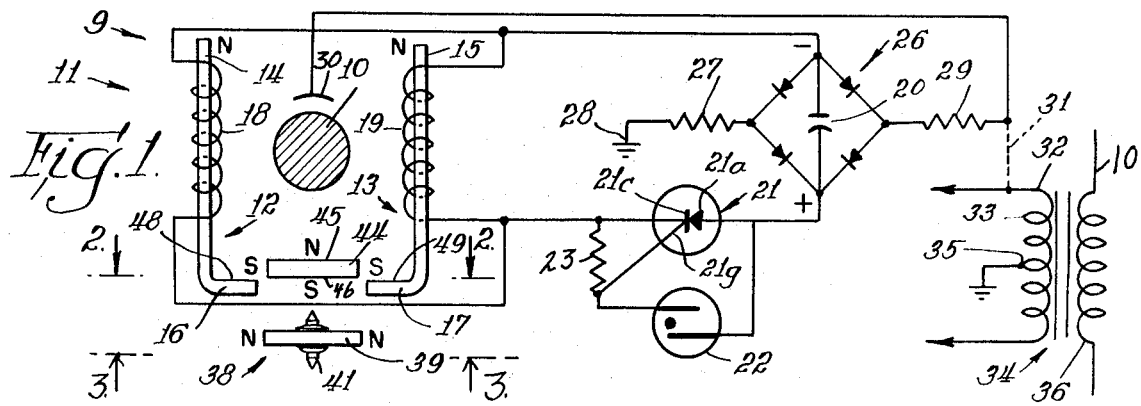
Fig.1.
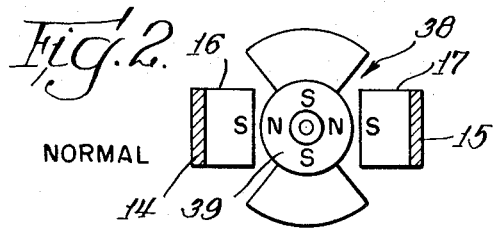
Fig.2. NORMAL
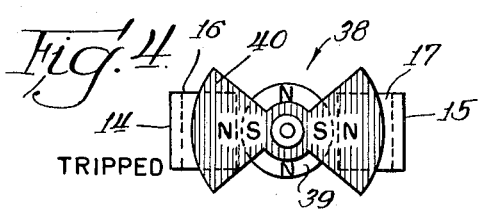
Fig.4. TRIPPED
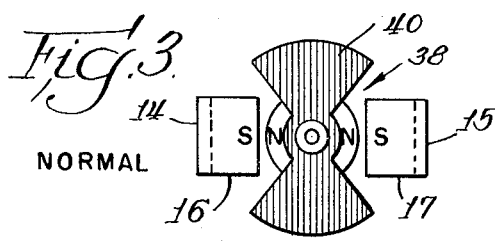
Fig.3. NORMAL
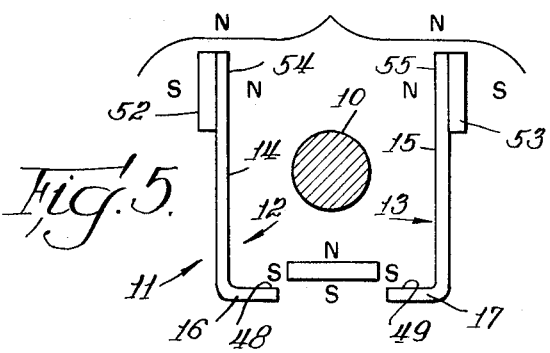
Fig.5.
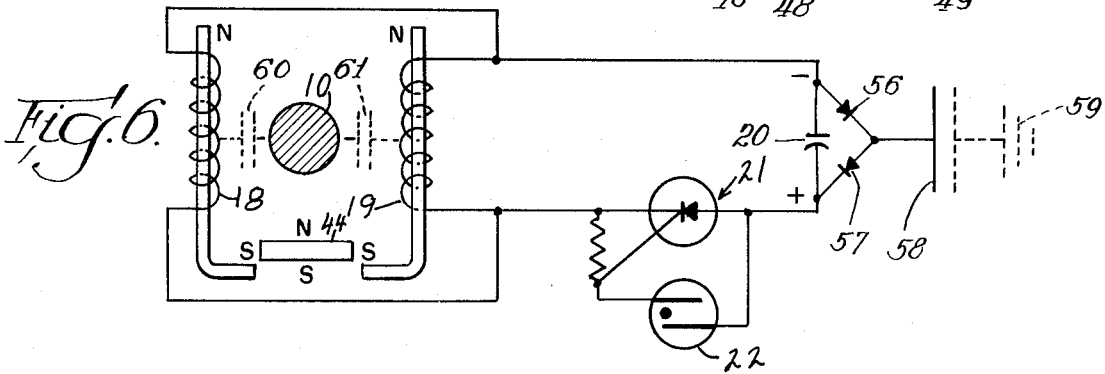
Fig.6.
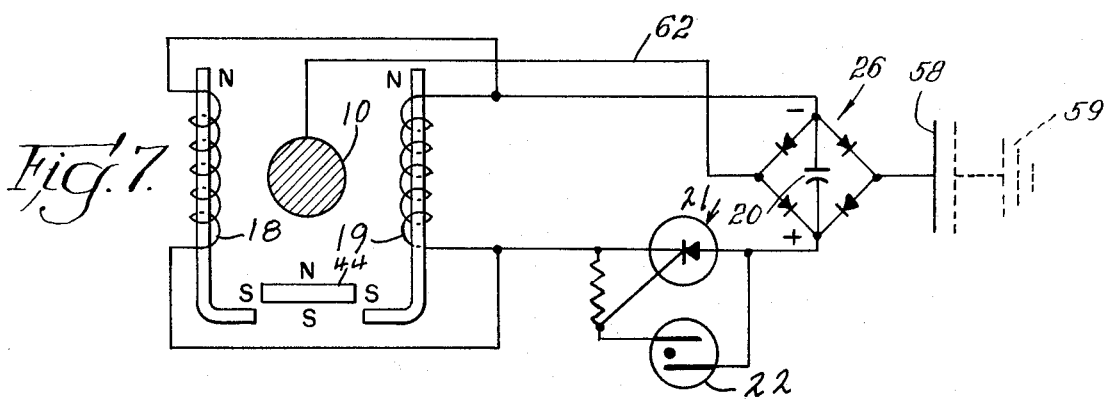
Fig.7.

AUTOMATICALLY RESETTABLE FAULT INDICATOR

This invention relates to automatically resettable alternating current fault indicators and is an improvement over the disclosures of U.S. Pat. Nos. 3,348,099 issued Oct. 17, 1967, 3,426,276 issued Feb. 4, 1969 and 3,558,984 issued Jan. 26, 1971, and of applications Ser. Nos. 55,532 filed July 16, 1970, 119,639, filed Mar. 1, 1971, and 148,440, filed June 1, 1971.

Among the objects of this invention are: To provide for shifting a permanent magnet fault indicating rotor from a normal position to a fault indicating position on flow of alternating fault current in a conductor and for shifting the fault indicating rotor to the normal position on reenergization of the conductor; to employ for this purpose a pair of L-shaped pole pieces arranged to be magnetized with unidirectional magnetic flux on normal energization of the conductor and to be demagnetized on flow of alternating fault current in the conductor; to provide magnetic poles of like polarity at the opposed distal ends of the short legs of the L-shaped pole pieces for holding the fault indicating rotor in the normal position; to employ a biasing permanent magnet offset from the short legs of the L-shaped pole pieces and magnetized to opposite polarities on opposite sides for inducing poles in the distal ends of the short legs having polarities opposite to the polarities normally inducted therein for shifting the fault indicating rotor to fault indicating position when the L-shaped legs are demagnetized on flow of alternating fault current in the conductor; to magnetize the L-shaped pole pieces by windings on their long legs energized from a capacitor that is charged by a rectifier which is energized electrostatically from the conductor or from the secondary winding of a transformer the primary winding of which is energized from the conductor; to trigger the discharge of the capacitor when it is charged to a predetermined voltage to energize the windings; and to employ permanent magnets at the distal ends of the long legs of the L-shaped pole pieces for varying the fault current required to effect shifting of the fault indicating rotor to fault indicating position.

In the drawing:

FIG. 1 shows diagrammatically a fault indicating system embodying this invention.

FIG. 2 is a horizontal sectional view taken generally along line 2—2 of FIG. 1 and showing the fault indicating rotor and target carried thereby in the normal position.

FIG. 3 is a bottom plan view taken generally along line 3—3 of FIG. 1.

FIG. 4 is a view, similar to FIG. 3, but showing the fault indicating rotor and target in the tripped or fault indicating position.

FIG. 5 is a view, similar to FIG. 1, insofar as the magnetic circuit is concerned and illustrating how permanent magnets can be applied to the L-shaped pole pieces for varying the fault current response of the fault indicating rotor.

FIGS. 6 and 7 show alternate systems for charging the capacitor.

In FIG. 1 reference character 9 indicates, generally, a fault indicating system for use in conjunction with a conductor 10 in which normally alternating current of 60 Hz flows at a voltage of the order of 7.5 kv and upwards. The fault indicating system 9 includes a magnetic circuit that is indicated, generally, at 11 for embracing the conductor 10 and it comprises a pair of L-shaped pole pieces of demagnetizable low coercive force material which are indicated, generally, at 12 and 13. The L-shaped pole pieces 12 and 13 have long legs 14 and 15 which are disposed in parallel relation on opposite sides of the conductor 10. Also they include short legs 16 and 17 which extend toward each other with their distal ends in spaced relation. For the purpose of normally magnetizing the L-shaped pole pieces 12 and 13 with the polarities indicated at the distal ends of the long legs 14 and 15 and short legs 16 and 17 windings 18 and 19 are positioned on the long legs 14 and 15.

The windings 18 and 19 may be connected in parallel circuit relation and for energization to a capacitor 20 through an SCR that is indicated, generally, at 21 and includes an anode 21a, a cathode 21c and a gate 21g. For triggering a glow discharge device 22 is employed which may be in the form of a neon lamp. A leakage resistor 23 is connected between the cathode 21c and the gate 21g.

Provision is made for charging the capacitor 20 as a result of energization of the conductor 10. For this purpose a rectifier bridge, indicated generally at 26, is employed. The bridge 26 is connected through a resistor 27 to ground that is indicated at 28. Another side of the bridge 26 is connected through a resistor 29 to a capacitor plate 30 which is positioned in proximity to the conductor 10 and thus is electrostatically positioned with respect thereto. The capacitor plate 30 may be a test point of a conventional plug in connector such as that shown in Tachick U.S. Pat. No. 3,513,394, issued May 19, 1970. Alternatively as indicated by the broken line conductor 31 the resistor 29 can be connected to a secondary terminal 32 of a secondary winding 33 of a distribution transformer that is indicated, generally, at 34. The secondary winding 33 may be provided with a grounded center tap 35 and a primary winding 36 which is connected for energization to the conductor 10.

Associated with the short legs 16 and 17 of the magnetic circuit 11 is a fault indicating rotor that is indicated, generally, at 38. It includes a four pole permanent magnet 39. As shown in FIG. 2 it will be observed that diammetrically opposite north poles are positioned symmetrically between diammetrically positioned south poles. The arrangement is such that the fault indicating rotor 38, under normal operating conditions, occupies the normal position shown in FIG. 2 or FIG. 3. As a result of flow of fault current in the conductor 10, the fault indicating rotor 38 is shifted through 90° to the position shown in FIG. 4. Secured to the permanent magnet 39 is a target 40 which, as shown in FIG. 3, may be provided with a red surface. The permanent magnet 39 and target 40 are secured to a pivot hub 41 for conjoint rotation. Suitable means, not shown, are provided for rotatably mounting the pivot hub 41.

In order to shift the fault indicating rotor 39 to the tripped or fault indicating position shown in FIG. 4, a biasing permanent magnet 44 is employed. The biasing permanent magnet 44 can be rectangular or circular. It is important that it be polarized on opposite sides 45 and 46. For example, with the L-shaped pole pieces 12 and 13 magnetized with the polarities indicated in FIG. 1, the sides 45 and 46 are respectively magnetized to north and south polarities. Attention is directed to the fact that the biasing permanent magnet 44 is positioned out of alignment with the opposed short legs 16 and 17 and is spaced slightly above the plane of the upper sides 48 and 49 of the short legs 16 and 17 toward the conductor 10.

In operation, it is assumed that normal load current is flowing in the conductor 10 and that the primary winding 36 of the distribution transformer 34 is energized. Energizing voltage then is applied to the rectifier bridge 26. When the capacitor 20 is charged to a voltage sufficient to cause the glow discharge device 22 to break down and become conducting, the SCR 21 is rendered conducting and unidirectional current flows through the parallel connected windings 18 and 19. As shown they are connected in parallel. However, they can be connected in series, if desired. The current flow in the windings 18 and 19 is such as to magnetize the distal ends of the short legs 16 and 17 with south polarities. Since these polarities are opposite to the north polarities of the permanent magnet 39 which forms a part of the fault indicating rotor 38, the latter is held in the position shown in FIGS. 2 and 3.

Assuming now that a fault current of the order of 500 amperes flows in the conductor 10, the alternating magnetic field generated thereby demagnetizes the L-shaped pole pieces 12 and 13. As a result of the demagnetization of the short legs 16 and 17, the biasing permanent magnet 44 induces north poles in the distal ends of the short legs 16 and 17, as indicated in FIG. 4. Because of this the north poles of the permanent magnet 39 of the fault indicating rotor 38 are repelled and the south poles are attracted. The fault indicating rotor 38 then is pivoted through 90° to the position shown in FIG. 4.

Presumably the energizing circuit for the conductor 10 is interrupted by a fuse or circuit breaker and it is deenergized. The fault indicating rotor 38 remains in the tripped or fault indicating position.

It is desirable to automatically reset the fault indicating rotor 38 to the normal position on reenergization of the conductor 10 or reenergization of the distribution transformer 34. Accordingly, the rectifier bridge 26 is energized either as a result of the electrostatic relationship between the capacitor plate 30 or energization of the distribution transformer 34, it being understood that these are alternate arrangements and not used simultaneously. As soon as the voltage to which the capacitor 20 is charged is sufficient to effect a break down of the glow discharge device 22, the SCR 21 is rendered conducting and unidirectional current flows through the windings 18 and 19 which can be considered as reset windings. Under the assumed relationships south poles are induced in the distal ends of the short legs 16 and 17. The south poles of the permanent magnet which forms a part of the fault indicating rotor 38 are repelled and the north poles are attracted. It follows that the fault indicating rotor 38 is pivoted through 90° to the normal position shown in FIGS. 2 and 3.

It is important that provision be made for varying the level of the fault current at which the fault indicating rotor 38 is shifted to the fault indicating position. The normal load current for the conductor 10 may be of the order of 100, 450, 800 or 1,000 amperes depending upon the load that is supplied. The fault indicating system 9 should be operative only when the flow of alternating current in the conductor 10 exceeds the particular maximum normal load current intended to be carried by it. One way to vary the fault current response of the system 9 is to appropriately employ a corresponding heat treatment for the L-shaped pole pieces 12 and 13. Alternatively, as shown in FIG. 5, permanent magnets 52 and 53 can be positioned on the distal ends 54 and 55 of the long legs 14 and 15. As indicated the permanent magnets 52 and 53 are magnetized on opposite sides with the polarities indicated, the north poles being juxtaposed to the surfaces of the distal ends 54 and 55. Assuming that the characteristics of the long legs 14 and 15, without the addition of the permanent magnets 52 and 53, is such that the fault indicating rotor 38 is shifted to the fault indicating position on flow of 500 amperes in the conductors 10, then with the addition of the permanent magnets 52 and 53 the fault current level at which the fault indicating rotor 38 is shifted is reduced to 400 amperes. By reversing the positions of the permanent magnets 52 and 53 so that the south poles are juxtaposed to the surfaces of the distal ends 54 and 55, the fault current level is increased to 800 amperes. It will be understood that these specific figures are illustrative of the results that can be obtained. Also it will be understood that the permanent magnets 52 and 53 can be circular or rectangular, it being recalled that opposite faces are polarized to the polarities indicated.

FIG. 6 illustrates how the capacitor 20 can be charged through rectifiers 56 and 57 which are commonly connected to a counterpoise 58 which is capacitively related to ground at 59. Here the windings 18 and 19 are shown as being capacitively connected to the conductor 10 at 60 and 61. Otherwise the system operates as described for FIG. 1.

In FIG. 7 the rectifier bridge 26 is connected between the counterpoise 58 and the conductor 10 by a conductor 62. The capacitor 20 is charged on reenergization of the conductor 10 to normal voltage to reset the target 40 to the normal position in the manner previously described.

I claim:

1. Means responsive to flow of alternating fault current in and energization of a conductor comprising: a magnetic circuit of low coercive force demagnetizable material for embracing said conductor in which alternating demagnetizing flux is induced by alternating current flow in said conductor and having a pair of pole pieces extending toward each other, winding means on said magnetic circuit energized with unidirectional current on energization of said conductor with alternating current to induce poles of the same polarity in said pole pieces, a stationary permanent magnet between and displaced from alignment with said pole pieces and having magnetic poles of opposite polarity on opposite sides for inducing magnetic poles of the same polarity in said pole pieces opposite to said one polarity, and a pivotable fault indicating permanent magnet adjacent said pole pieces and said stationary permanent magnet having diametrical poles of one polarity between diametrical poles of opposite polarity, said fault indicating permanent magnet being biased to a normal position by magnetic flux from said pole pieces induced therein by said winding means and biased to a fault indicating position by magnetic flux from said pole pieces induced therein by said stationary permanent magnet following demagnetization of said pole pieces by flow of fault current in said conductor.

2. Current and energization means according to claim 1 wherein said magnetic circuit includes a pair of L-shaped magnetic members with said pole pieces being formed by the short legs thereof and said winding means being located on the long legs thereof.

3. Current and energization means according to claim 1 wherein capacitor means is connected to be charged on energization of said conductor and is connected to discharge through said winding means to magnetize said pole pieces when the voltage to which said capacitor means is charged reaches a predetermined value.

4. Current and energization means according to claim 3 wherein rectifier means connected between ground and a capacitor plate electrostatically disposed with respect to said conductor charges said capacitor means.

5. Current and energization means according to claim 3 wherein a transformer has a primary winding connected for energization to said conductor and a secondary winding with secondary terminals and a grounded center tap, and rectifier means connected between ground and one of said secondary terminals charges said capacitor.

6. Current and energization means according to claim 3 wherein gated semiconductor means connected between said capacitor means and said winding means is rendered conducting when said capacitor means is charged to a predetermined unidirectional voltage.

7. Current and energization means according to claim 1 wherein said stationary permanent magnet is positioned on the sides of said pole pieces facing said conductor.

8. Current and energization means according to claim 2 wherein a permanent magnet having magnetic poles of opposite polarity is positioned at the distal end of each of said long legs of said L-shaped magnetic members.

9. Current and energization means according to claim 3 wherein said windings are electrostatically related to said conductor, a counterpoise is spaced from said conductor, and rectifier means connected between said windings and said counterpoise charges said capacitor means.

10. Current and energization means according to claim 3 wherein a counterpoise is spaced from said conductor, and rectifier means connected between said counterpoise and ground charges said capacitor means.

* * * * *